(12) United States Patent
Kanagovi et al.

(10) Patent No.: US 11,017,452 B2
(45) Date of Patent: May 25, 2021

(54) CONCERTED LEARNING AND MULTI-INSTANCE SEQUENTIAL PREDICTION TREE

(71) Applicant: Dell Products L.P., Round Rock, TX (US)

(72) Inventors: Ramakanth Kanagovi, Bangalore (IN); Arnab Chowdhury, Bangalore (IN); Sumant Sahoo, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 16/154,903

(22) Filed: Oct. 9, 2018

(65) Prior Publication Data

US 2020/0111147 A1    Apr. 9, 2020

(51) Int. Cl.
  *G06Q 30/00* (2012.01)
  *G06Q 30/06* (2012.01)
  *G06N 5/02* (2006.01)

(52) U.S. Cl.
  CPC ........... *G06Q 30/0631* (2013.01); *G06N 5/02* (2013.01)

(58) Field of Classification Search
  CPC .................................................. G06Q 30/0631
  See application file for complete search history.

(56) References Cited

U.S. PATENT DOCUMENTS

| 10,088,331 | B1* | 10/2018 | Yeh ..................... | G01C 21/3679 |
| 2014/0222530 | A1* | 8/2014 | Wegner .............. | G06Q 30/0207 |
| | | | | 705/14.1 |
| 2016/0086250 | A1* | 3/2016 | Gunjan .............. | G06Q 30/0631 |
| | | | | 705/26.7 |

OTHER PUBLICATIONS

Li, Dancheng, et al. "A method of purchase prediction based on user behavior log." 2015 IEEE International Conference on Data Mining Workshop (ICDMW). IEEE, 2015.*

Yanpeng Zhao et al., Sequence Prediction Using Neural Network Classifiers, JMLR: Workshop and Conference Proceedings 57:164-169, 2016, The Sequence Predictiction ChallengE (SPiCe), http://proceedings.mlr.press/v57/zhao16.pdf.

Benjamin Letham et al., Sequential event prediction, Machine Learning, Nov. 2013, vol. 93, Issue 2-3, pp. 357-380, 2013, https://users.cs.duke.edu/~cynthia/docs/LethamRuMa13.pdf.

* cited by examiner

*Primary Examiner* — Kathleen Palavecino
(74) *Attorney, Agent, or Firm* — Terrile, Cannatti & Chambers; Stephen A. Terrile

(57) ABSTRACT

A method, system and computer readable medium for performing a purchase prediction operation. The purchase prediction operation includes: selecting a target purchaser, the purchase prediction operation providing a purchase prediction for the target purchaser; capturing a product term associated with a most recent purchase period of the target purchaser; performing a sequential recommendation operation, the sequential recommendation operation providing a sequence recommendation score; and, generating a purchase pattern prediction for the target user based upon the sequential recommendation score.

20 Claims, 12 Drawing Sheets

| Purchaser 402 | Purchase Period 404 | | | | | | | | | |
|---|---|---|---|---|---|---|---|---|---|---|
| | '1' | '2' | '3' | '4' | '5' | '6' | '7' | '8' | '9' | '10' |
| 1001 | | | qw | | r | r | | e | | |
| 1002 | | qw | r | | | r | e | qw | | r |
| 1003 | qw | | qwe | qw | t | w | e | e | ty | |
| 1004 | ty | ty | | qw | qw | q | rty | y | ty | t |
| 1005 | er | rty | rty | er | | rty | w | | t | rty |
| 1006 | y | ty | qwe | t | | rty | | w | | |
| 1007 | | | er | | | rty | | w | | |
| 1008 | qw | | qw | r | rty | | | r | rty | q |
| 1009 | q | | r | w | | | rty | er | | y |
| 1010 | ty | t | r | y | t | | t | y | | |

406 Combinations Of Products Purchased During Each Purchase Period

Figure 4a

| Purchaser 402 | Purchase Period 404 | | | | | | | | | |
|---|---|---|---|---|---|---|---|---|---|---|
| | '1' | '2' | '3' | '4' | '5' | '6' | '7' | '8' | '9' | '10' |
| 1001 | GAP | GAP | qw | GAP | r | r | GAP | e | GAP | GAP |
| 1002 | GAP | qw | r | GAP | GAP | r | e | qw | GAP | r |
| 1003 | qw | GAP | qwe | qw | t | w | e | e | ty | GAP |
| 1004 | ty | ty | GAP | qw | qw | q | rty | y | ty | t |
| 1005 | er | rty | rty | er | GAP | rty | w | GAP | t | rty |
| 1006 | y | ty | qwe | t | GAP | rty | GAP | w | GAP | GAP |
| 1007 | GAP | GAP | er | GAP | GAP | rty | GAP | w | GAP | GAP |
| 1008 | qw | GAP | qw | r | rty | GAP | GAP | r | rty | q |
| 1009 | q | GAP | r | w | GAP | GAP | rty | er | GAP | y |
| 1010 | ty | t | r | y | t | GAP | t | y | GAP | GAP |

408 GAPs In Purchase Periods

Figure 4b

| Purchaser 402 | q | w | e | r | t | y |
|---|---|---|---|---|---|---|
| 1001 | 0.200 | 0.200 | 0.200 | 0.400 | 0.000 | 0.000 |
| 1002 | 0.250 | 0.250 | 0.125 | 0.375 | 0.000 | 0.000 |
| 1003 | 0.231 | 0.308 | 0.231 | 0.000 | 0.154 | 0.077 |
| 1004 | 0.188 | 0.125 | 0.000 | 0.062 | 0.312 | 0.312 |
| 1005 | 0.000 | 0.056 | 0.111 | 0.333 | 0.278 | 0.222 |
| 1006 | 0.091 | 0.182 | 0.091 | 0.091 | 0.273 | 0.273 |
| 1007 | 0.000 | 0.167 | 0.167 | 0.333 | 0.167 | 0.167 |
| 1008 | 0.231 | 0.154 | 0.000 | 0.308 | 0.154 | 0.154 |
| 1009 | 0.111 | 0.111 | 0.111 | 0.333 | 0.111 | 0.222 |
| 1010 | 0.000 | 0.000 | 0.000 | 0.125 | 0.500 | 0.375 |

504 Products — 506 — 500

Figure 5

| Target Purchaser 602 | '1' | '2' | '3' | '4' | '5' | '6' | '7' | '8' | '9' | '10' |
|---|---|---|---|---|---|---|---|---|---|---|
| 1002 | GAP | qw | r | GAP | GAP | r | e | qw | GAP | r |

404 Purchase Periods — 600
Product(s) Purchased In Most Recent Purchase Period — 606

Figure 6

| Target Purchaser 602 | 1001 | 1002 | 1003 | 1004 | 1005 | 1006 | 1007 | 1008 | 1009 | 1010 |
|---|---|---|---|---|---|---|---|---|---|---|
| 1001 | 1.000 | 0.980 | 0.605 | 0.331 | 0.626 | 0.454 | 0.801 | 0.758 | 0.825 | 0.148 |
| 1002 | 0.980 | 1.000 | 0.642 | 0.383 | 0.573 | 0.471 | 0.750 | 0.836 | 0.800 | 0.139 |
| 1003 | 0.605 | 0.642 | 1.000 | 0.641 | 0.425 | 0.737 | 0.567 | 0.741 | 0.544 | 0.345 |
| 1004 | 0.331 | 0.383 | 0.641 | 1.000 | 0.731 | 0.950 | 0.619 | 0.792 | 0.697 | 0.882 |
| 1005 | 0.626 | 0.573 | 0.425 | 0.731 | 1.000 | 0.818 | 0.937 | 0.665 | 0.911 | 0.823 |
| 1006 | 0.454 | 0.471 | 0.737 | 0.950 | 0.818 | 1.000 | 0.779 | 0.772 | 0.776 | 0.863 |
| 1007 | 0.801 | 0.750 | 0.567 | 0.619 | 0.937 | 0.779 | 1.000 | 0.709 | 0.943 | 0.625 |
| 1008 | 0.758 | 0.836 | 0.741 | 0.792 | 0.665 | 0.772 | 0.709 | 1.000 | 0.823 | 0.515 |
| 1009 | 0.825 | 0.800 | 0.544 | 0.697 | 0.911 | 0.776 | 0.943 | 0.823 | 1.000 | 0.618 |
| 1010 | 0.148 | 0.139 | 0.345 | 0.882 | 0.823 | 0.863 | 0.625 | 0.515 | 0.618 | 1.00 |

706 Highest Similarity Quotient Scores — 704 Neighbor Purchasers — 700
704 Similarity Quotient Scores

Figure 7

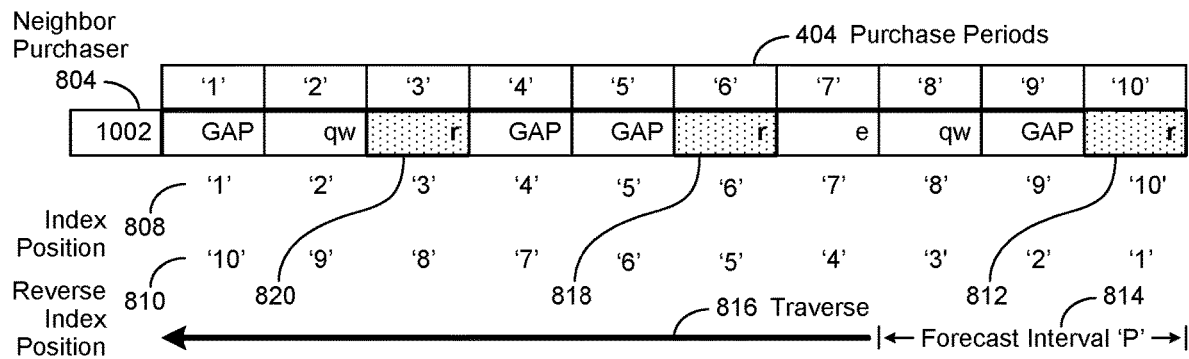
Figure 8a
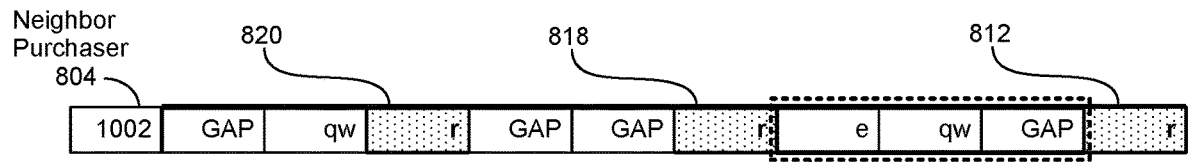
Figure 8b
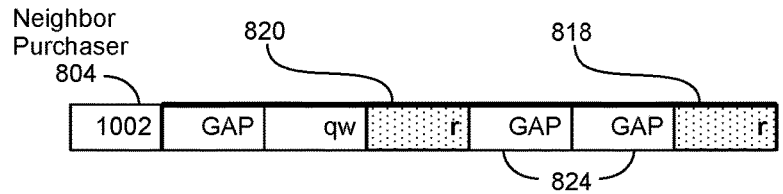
Figure 8c
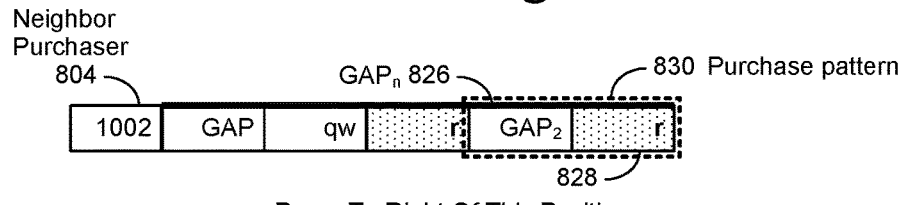
Figure 8d
Figure 8e

| Reverse Index Position 902 | Sequences 904 |
|---|---|
| 5 | e \| qw \| GAP |
| 8 | GAP2 \| r |

Figure 9a

| Neighbors 906 | Similarity Quotient Score 908 | Reverse Index Position 902 | Purchase Patterns 904 |
|---|---|---|---|
| 1002 | 1.000 | 5 | e \| qw \| GAP |
|  |  | 8 | GAP$_2$ \| r |
| 1001 | 0.980 | 5 | GAP \| e \| GAP$_2$ |
|  |  | 6 | r \| GAP |
| 1008 | 0.836 | 7 | rty \| GAP \| r |
| ⋮ | ⋮ | ⋮ | ⋮ |

Figure 9b

| Product Term 910 | Element Score 912 |
|---|---|
| e | 1.871 |
| qw | 1.363 |
| GAP | 2.522 |
| GAP2 | 2.430 |
| r | 2.431 |
| rty | 1.324 |

Figure 9c

| Future Purchase Period 914 | '1' | '2' | '3' |
|---|---|---|---|
| Product Purchases 916 | GAP | r | GAP |

Figure 9d

CONCERTED LEARNING AND MULTI-INSTANCE SEQUENTIAL PREDICTION TREE

BACKGROUND OF THE INVENTION

Field of the Invention

The present invention relates to information handling systems. More specifically, embodiments of the invention relate to predicting a purchaser's purchase behavior for a future purchasing period.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium for predicting a purchaser's purchase behavior for a future purchasing period.

More specifically, in one embodiment the invention relates to a method for performing a purchase prediction operation, comprising: selecting a target purchaser, the purchase prediction operation providing a purchase prediction for the target purchaser; capturing a product term associated with a most recent purchase period of the target purchaser; performing a sequential recommendation operation, the sequential recommendation operation providing a sequence recommendation score; and, generating a purchase pattern prediction for the target user based upon the sequential recommendation score.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: selecting a target purchaser, the purchase prediction operation providing a purchase prediction for the target purchaser; capturing a product term associated with a most recent purchase period of the target purchaser; performing a sequential recommendation operation, the sequential recommendation operation providing a sequence recommendation score; and, generating a purchase pattern prediction for the target user based upon the sequential recommendation score.

In another embodiment the invention relates to a computer-readable storage medium embodying computer program code, the computer program code comprising computer executable instructions configured for: selecting a target purchaser, the purchase prediction operation providing a purchase prediction for the target purchaser; capturing a product term associated with a most recent purchase period of the target purchaser; performing a sequential recommendation operation, the sequential recommendation operation providing a sequence recommendation score; and, generating a purchase pattern prediction for the target user based upon the sequential recommendation score.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4a and 4b show a matrix depicting the historical purchase of certain products by various purchasers during a particular purchase period.

FIG. 5 shows a proportion of occurrences matrix.

FIG. 6 shows a purchase history table depicting product purchases historically made by a purchaser during various purchase periods.

FIG. 7 shows a purchaser similarity quotient matrix.

FIGS. 8a through 8e show a process flow of operations for identifying a historical purchase pattern associated with a target purchaser.

FIGS. 9a through 9d show a process flow of operations for forecasting a target purchaser's product purchases in future purchase periods.

DETAILED DESCRIPTION

Figure 1:
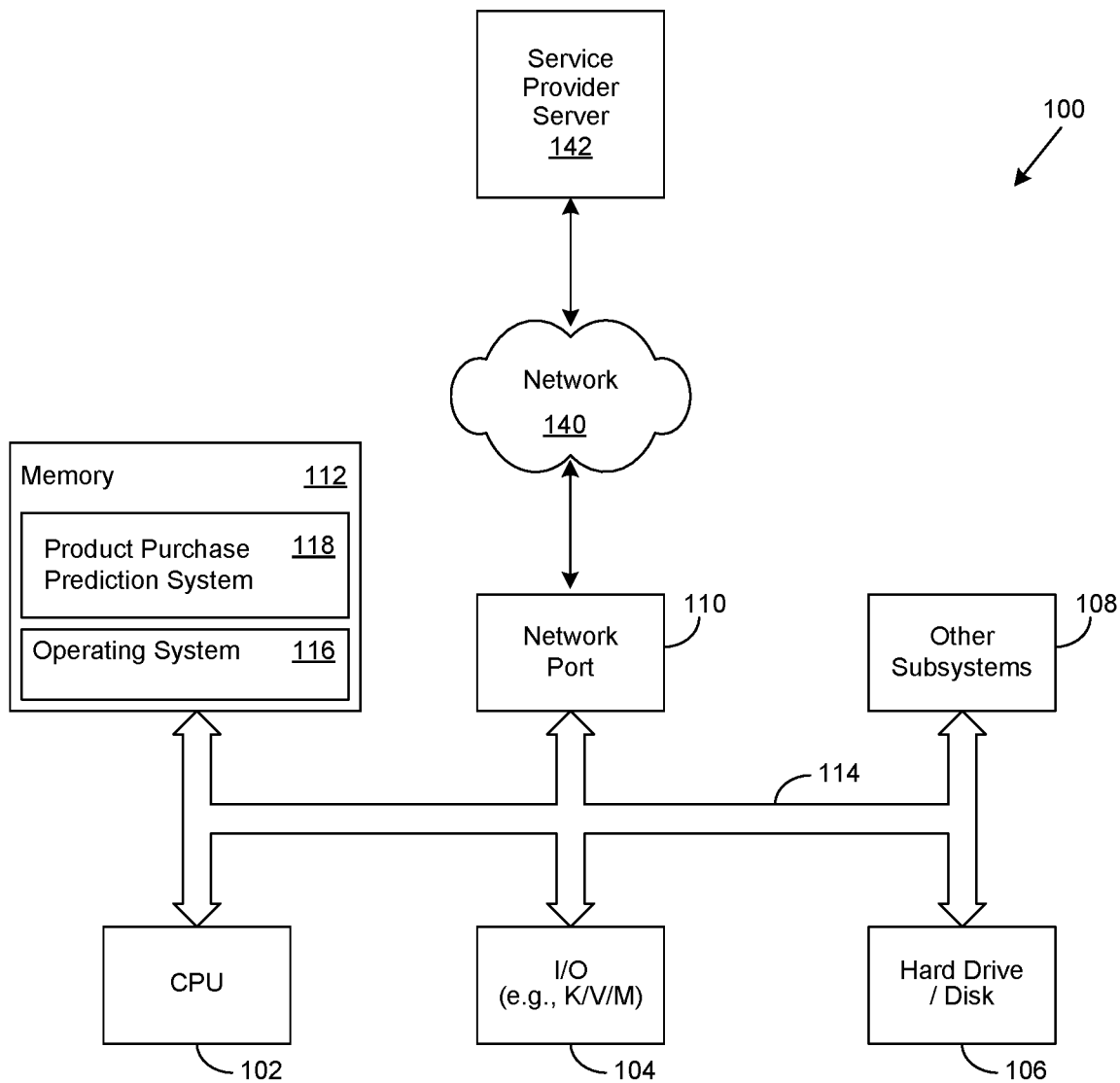
FIG. 1 shows a general illustration of components of an information handling system as implemented in the system and method of the present invention.

A system, method, and computer-readable medium for predicting a purchaser's purchase behavior for a future purchasing period. Certain aspects of the invention reflect an appreciation that a customer's purchases of particular products may be cyclical in nature. As an example, a customer may purchase a consistent number of laptop computers on a monthly basis, suggesting the ongoing hiring of new employees who have a need for mobile computing. As another example, the customer may purchase varying numbers of network-attached storage (NAS) units in the first quarter of each year, indicating a need to ensure sufficient storage capacity through the end of the year. As yet another example, purchases of high-capacity printers and copiers are typically purchased in the third quarter of each year, suggesting capital purchases being made with remaining budget balances.

Certain aspects of the invention reflect an appreciation that various approaches to recommending a product to an existing or potential customer are known. Various aspects of the invention likewise reflect an appreciation that certain of these approaches rely upon knowledge of past purchases made by a particular customer or customers that may share certain attributes.

One such known approach is collaborative filtering (CF), utilizes historical purchases of a group of customers to predict the most likely purchase by a similar customer. In typical implementations, CF predicts a list of products scored in descending order indicating their respective likeliness to be purchased. As an example, a customer may have purchased a particular model, or style, of computing device in the past. As a result, that same model or style of computing device may be suggested for purchase when a similar customer visits the vendor's website. As another example, other customers may have not only purchased that same model or style of computing device, but certain accessories as well. As a result, the accessories the other customers have purchased in the past may be suggested for purchase.

Certain aspects of the invention reflect an appreciation that known product recommendation approaches fail to account for a particular customer's historical sequence of purchases when making product recommendations. In certain embodiments, such a sequence of purchases may be related to time intervals, individual products, purchase amounts, or a combination thereof. As an example, a customer may make purchases from a vendor the last week of every quarter. As another example, a customer may cyclically purchase a foundation product, such as a server rack, and then a sequence of related products, such as individual servers thereafter, until another foundation product is needed, at which time the process is repeated. As yet another example, a customer may make large-value purchases once or twice a year and make incidental purchases in the intervening months.

Certain aspects of the invention reflect an appreciation that known product recommendation approaches likewise ignore a customer's non-purchase trends. As an example, a customer may spend a certain amount over the course of a year. However, those purchases may only be made every other month of the year. Consequently, certain resources may be needlessly consumed in an attempt to convince the customer to make purchases in months when they have no intention of making a purchase. Related to this example, certain aspects of the invention reflect an appreciation that those same resources may be directed more advantageously towards customers that are open to making a purchase during the same time period.

Likewise, certain aspects of the invention reflect an appreciation that known product recommendation approaches fail to differentiate a customer's historical purchase patterns. As an example, a particular customer may have historically purchased a preponderance of servers and desktop computers, which may indicate their use within a traditional information technology (IT) infrastructure. However, the customer may have begun purchasing fewer servers and an increasing number of laptop and tablet computers, which may indicate an increasingly mobile workforce and a corresponding migration to a cloud IT environment. Consequently, continuing to recommend servers and desktop computers can be counterproductive, as doing so may result in selling fewer laptop and tablet computers.

Certain aspects of the invention likewise reflect an appreciation that known approaches to product recommendation may predict a customer's most likely next purchase, but not sequence in which they will be made. As an example, based upon past purchases, it may be predicted that a customer will purchase one of five different products. In this example, the range of products may include a server, a NAS device, a router, a desktop computer, and a laptop. However, not knowing which of the products the customer intends to purchase may decrease the likelihood of a sale. To continue the example, offering a promotional price on the server is of little use if the customer is interested in purchasing a router, particularly if a competitive product is available for a lower price elsewhere.

Accordingly, certain aspects of the invention address the aforementioned drawbacks through the use of a concerted learning and multi-instance sequential prediction tree implemented as a sequential recommendation operation. In certain embodiments, the sequential recommendation operation may be implemented to include a concerted learning component (CLC) and a multi-instance sequential component (MISC). In certain embodiments, the operation may be implemented to use historical purchase patterns associated with similar customers to provide predictions of future purchases.

In certain embodiments, the operation may be implemented to search for the most recent list of products (MRLP) purchased by a target customer in their most recent purchase period. In certain embodiments, this process of searching for MRLP may be performed for all similar customers to build a prediction tree, which is based on the multi-instance occurrence of MRLP. In certain embodiments the prediction tree may be implemented to capture multiple sets of 'n' purchase sequences (n-PS) after the MRLP. In turn, MISC scores are computed for each of the n-PS. In certain embodiments, a scoring formula may be implemented to combine the CLC and the MISC scores to arrive at the 'n' most likely sequential purchases, where 'n' is the number of immediate future purchase periods, where each could have a prediction of one or more product purchases, or no purchases at all.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a product purchase prediction system 118.

The product purchase prediction system 118 performs a purchase prediction operation. The purchase prediction operation improves processor efficiency, and thus the efficiency of the information handling system 100, facilitating the prediction of when a particular item may be purchased. In certain embodiments, the purchase prediction operation can be performed during operation of an information handling system 100. As will be appreciated, once the information handling system 100 is configured to perform the purchase prediction operation, the information handling system 100 becomes a specialized computing device specifically configured to perform the purchase prediction operation and is not a general purpose computing device. Moreover, the implementation of the purchase prediction operation on the information handling system 100 improves the functionality of the information handling system 100 and provides a useful and concrete result of predicting which purchase will be made, and when, by a particular entity.

Figure 2:
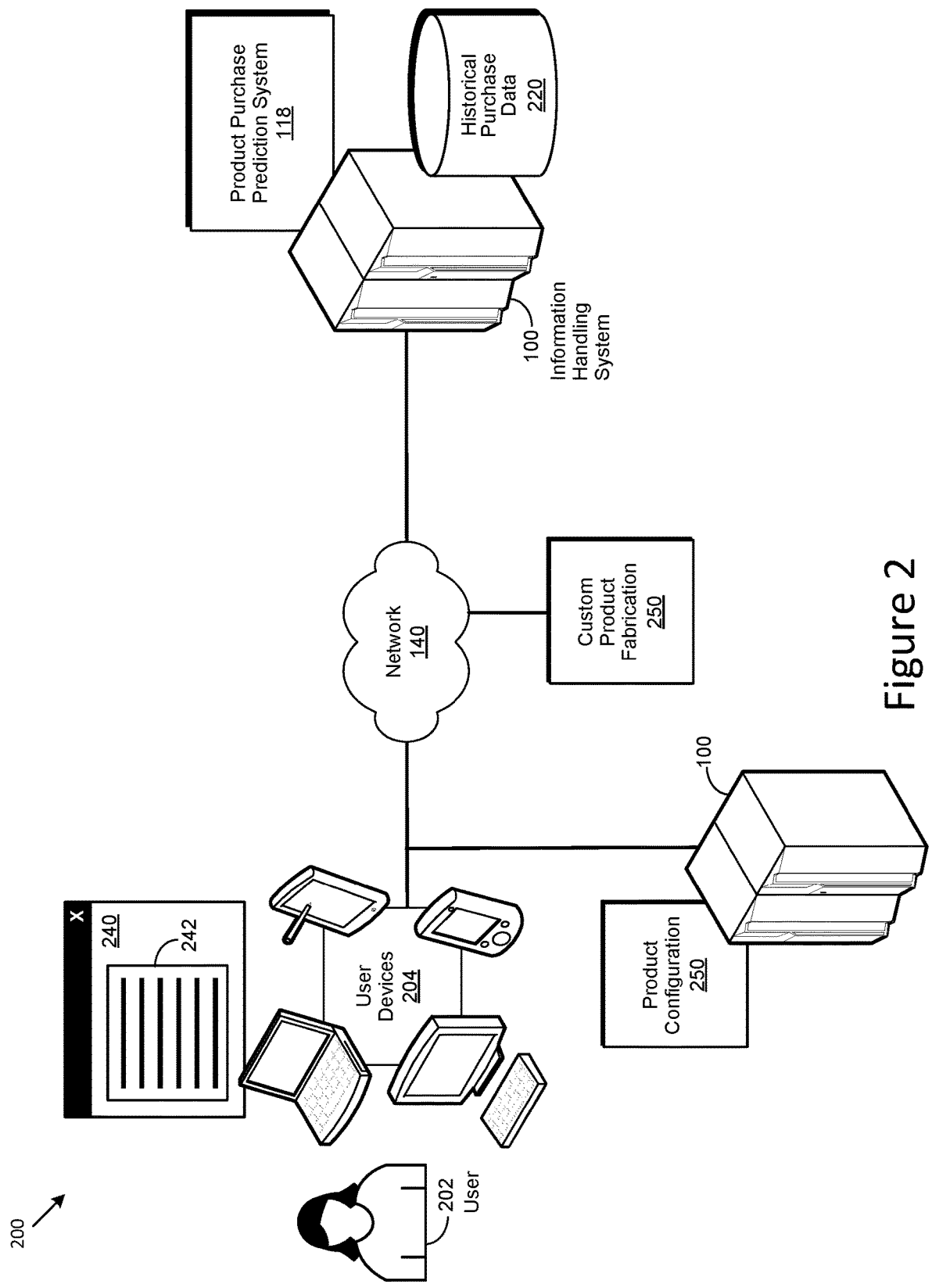
FIG. 2 shows a block diagram of a customer service interaction estimation environment.

FIG. 2 is a block diagram of a product purchase prediction environment 200 implemented in accordance with an embodiment of the invention. In certain embodiments, the product purchase prediction environment 200 may include a product purchase prediction system 118. In certain embodiments, the product purchase prediction environment 200 may include a repository of historical purchase data 220. In certain embodiments, the repository of historical purchase data 220 may be local to the system executing the product purchase prediction system 118 or may be executed remotely. In certain embodiments, the product purchase prediction system 118 may be implemented to perform various purchase prediction operations, as described in greater detail herein.

In certain embodiments, a user 202 may use a user device 204 to interact with the product purchase prediction system 118. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a purchase prediction system user interface (UI) 240. In certain embodiments, the purchase prediction system UI 240 may be implemented to present a graphical representation 242 of purchase prediction information, which is automatically generated in response to interaction with the product purchase prediction system 118.

In certain embodiments, the user device 204 is used to exchange information between the user 202 and the product purchase prediction system 118, a product configuration system 250, and a custom product fabrication system 250, through the use of a network 140. In certain embodiments, the network 140 may be a public network, such as a public internet protocol (IP) network, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the purchase prediction system UI 240 may be presented via a website. In certain embodiments, the website may be provided by one or more of the product purchase prediction system 118 and the product configuration system 250. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the product purchase prediction system 118 may be implemented to interact with the product configuration system 250, which in turn may be executing on a separate information handling system 100. In various embodiments, the product configuration system 250 interacts with a custom product fabrication system 252. In various embodiments, the custom product fabrication system 252 fabricates products, which may result in the generation of garbled text, which in turn may be associated with the custom product fabrication system 252 and the products it may fabricate. In certain embodiments, the product purchase prediction system 118 may be implemented to perform a purchase prediction function, as described in greater detail herein.

Figure 3:
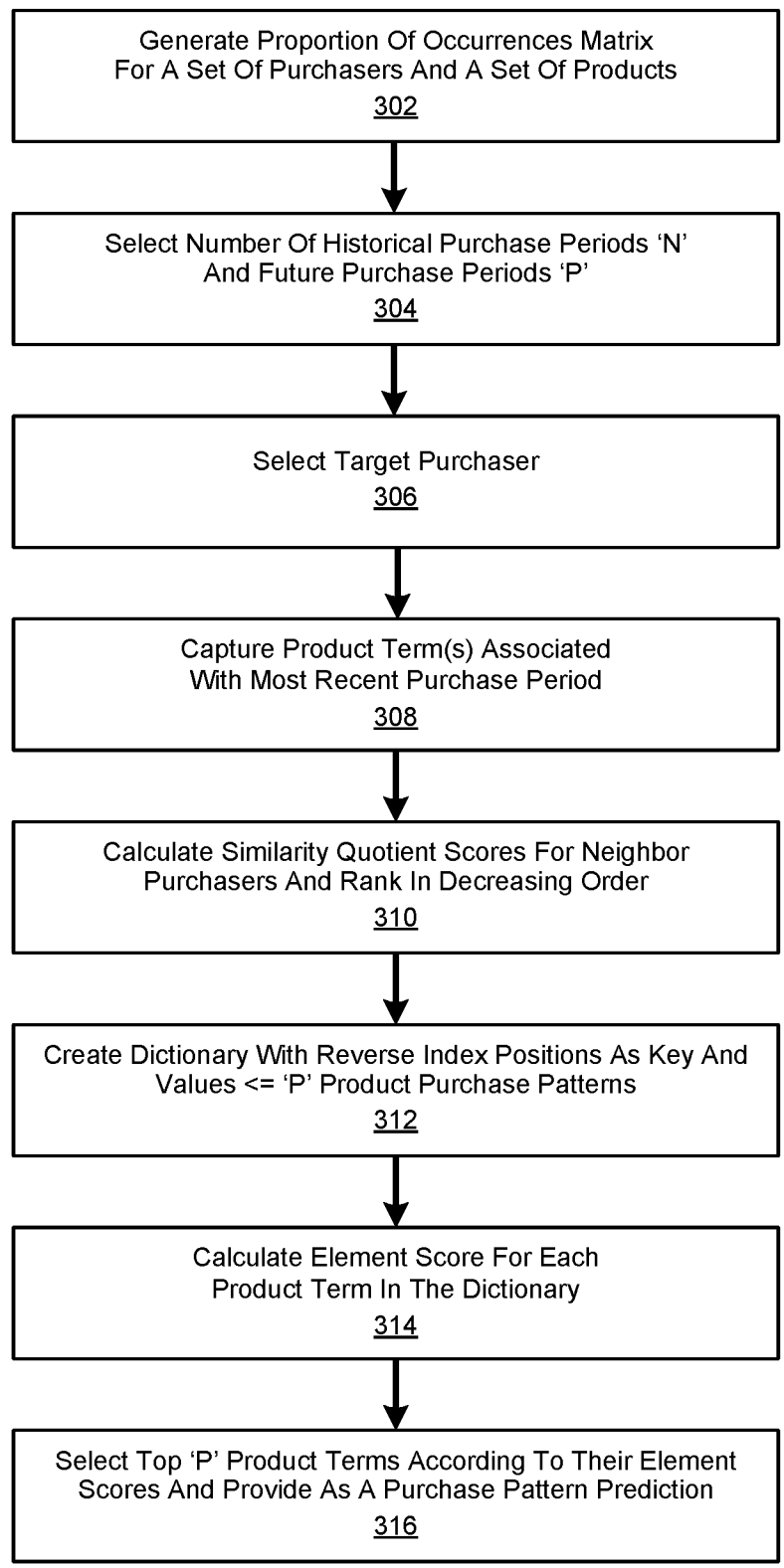
FIG. 3 shows a functional block diagram of the performance of purchase prediction operations.
Figure 10A:
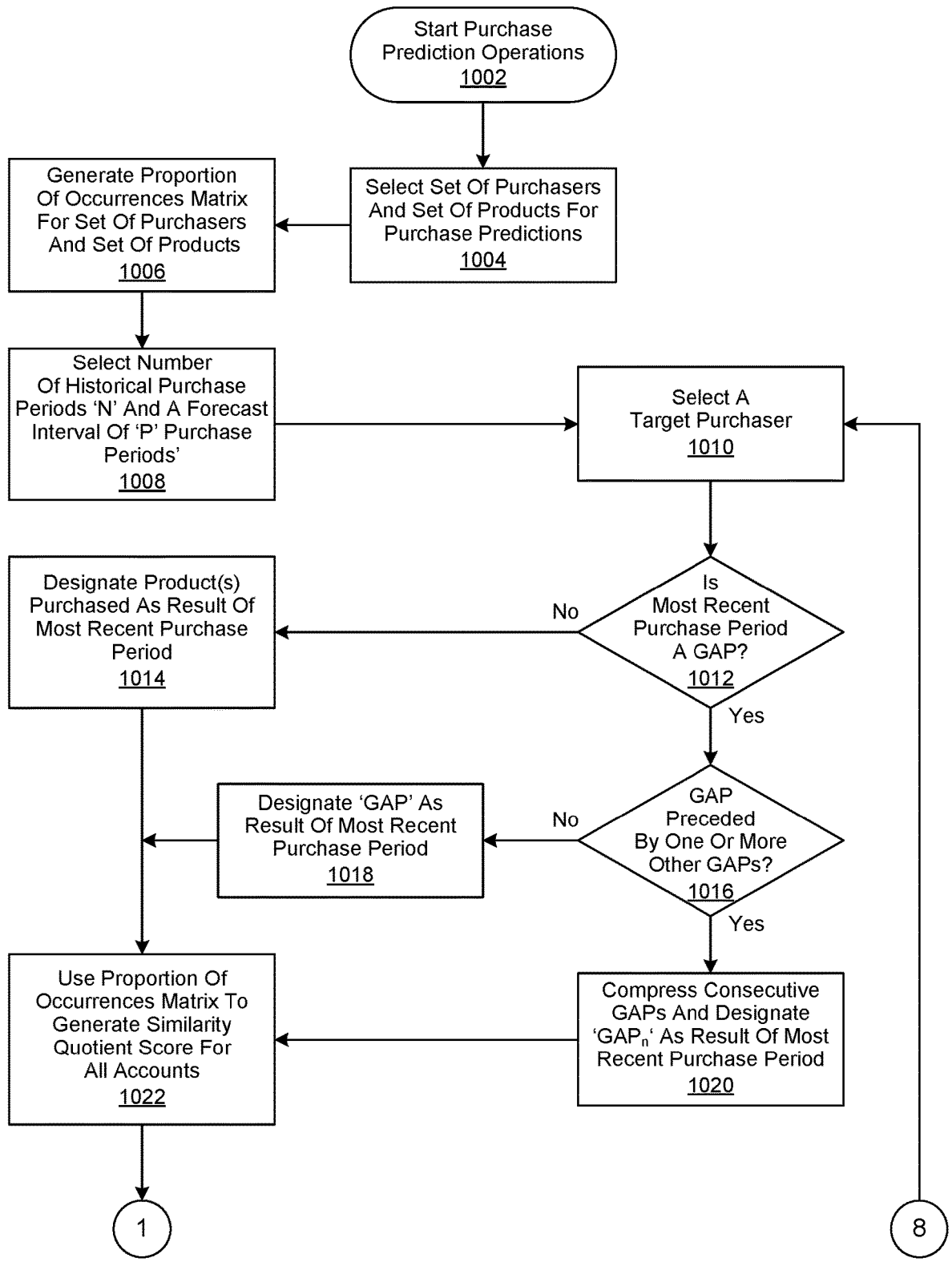
FIGS. 10a through 10d show a flowchart of the performance of product purchase prediction operations.
Figure 10B:
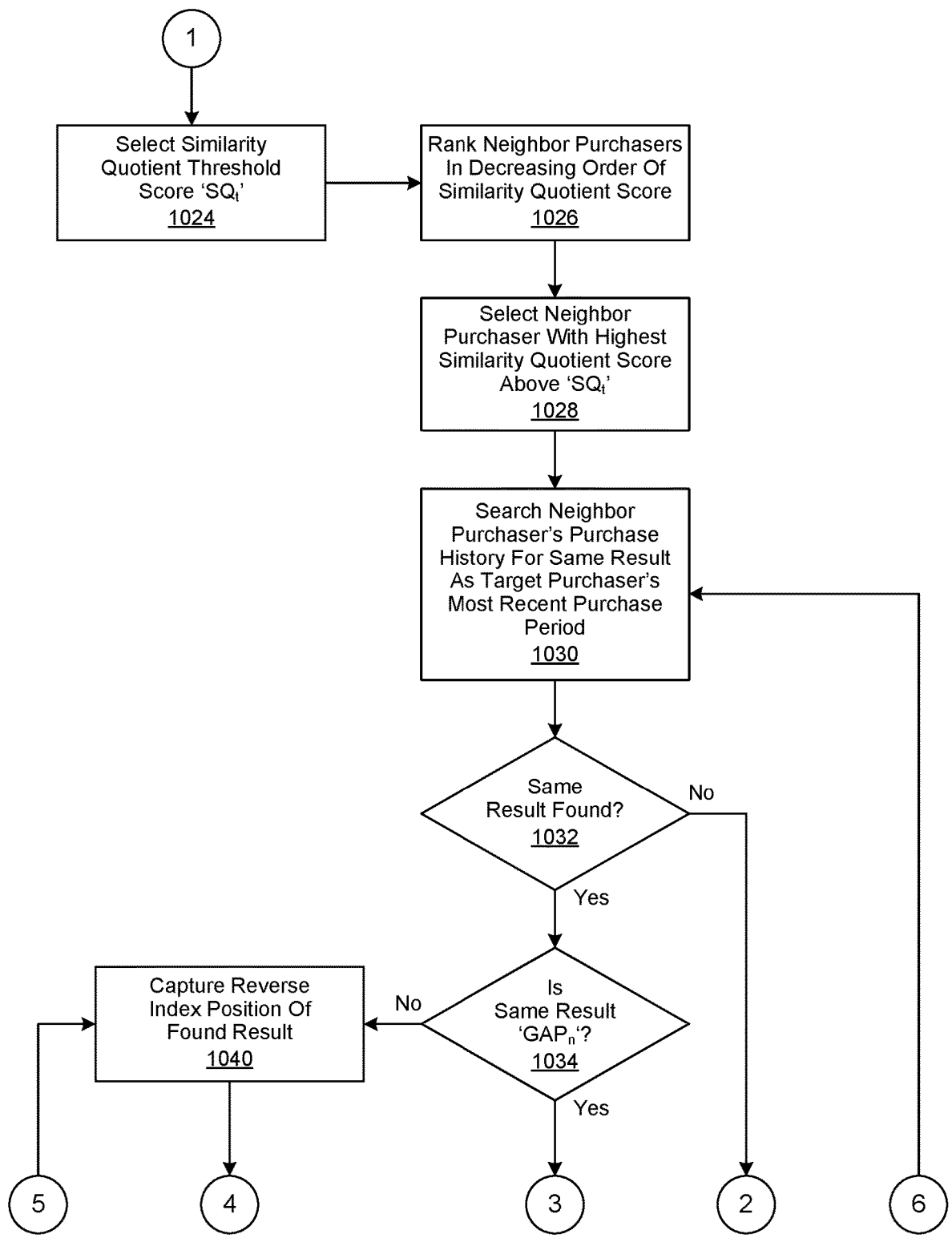
Figure 10C:
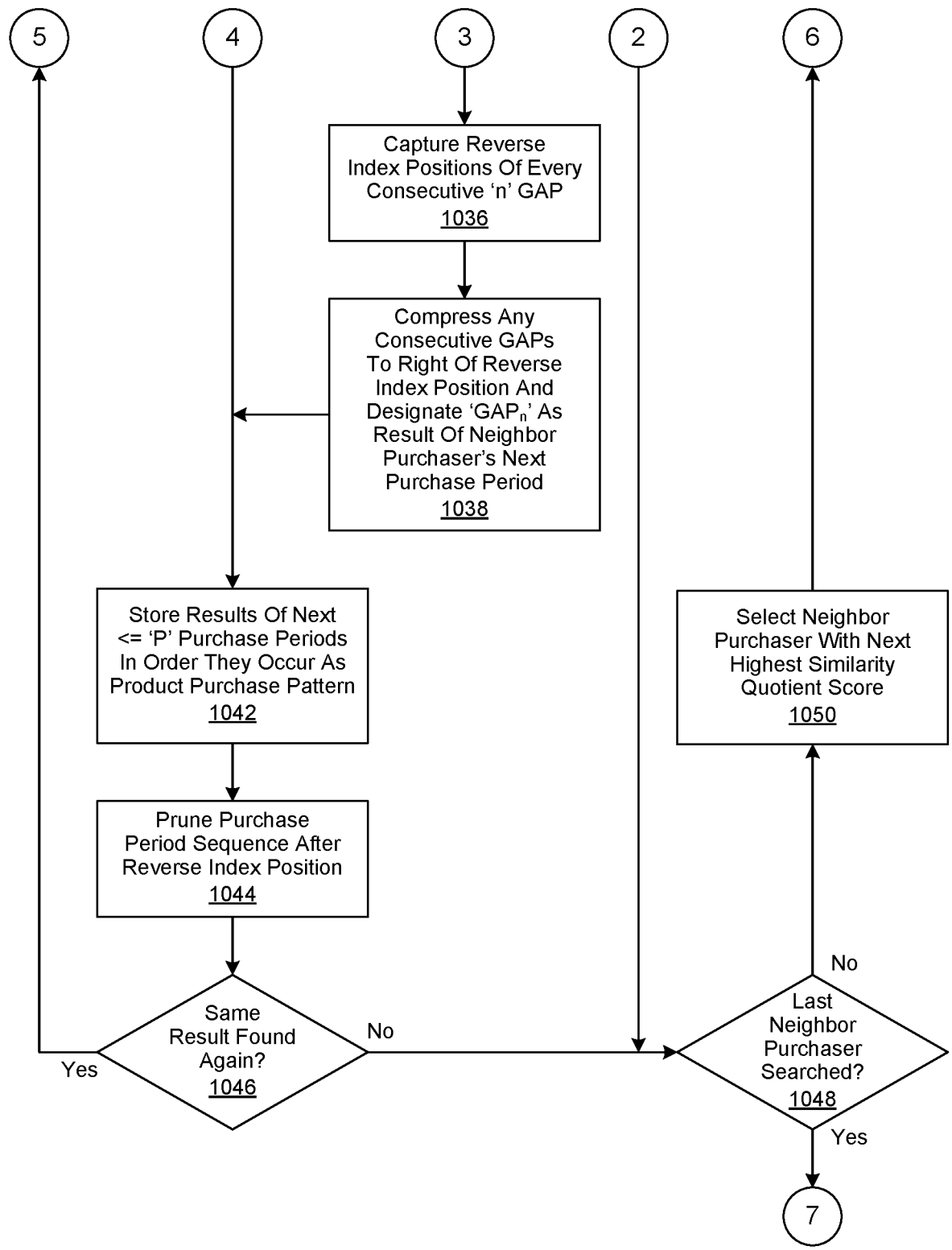
Figure 10D:
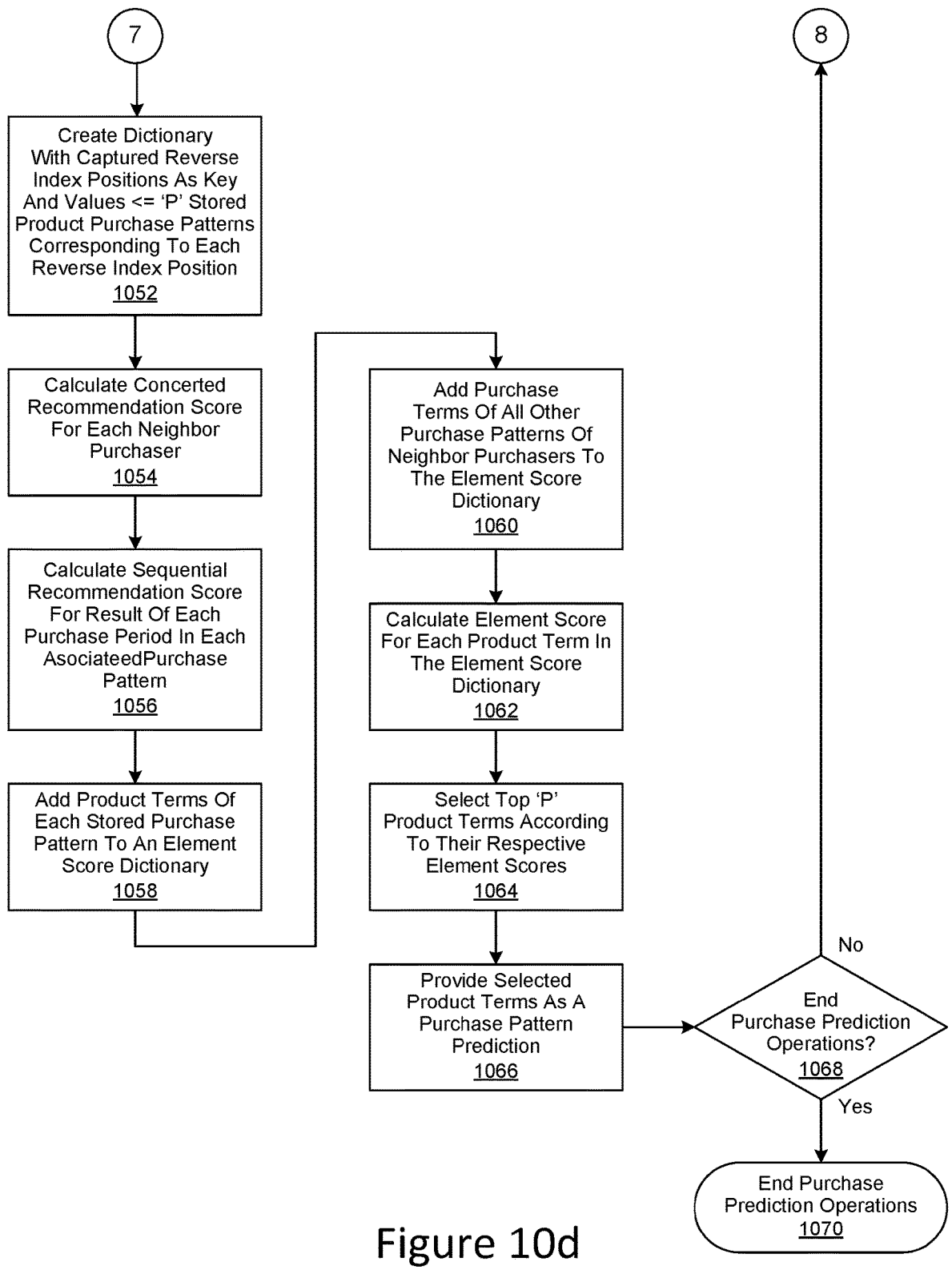

FIG. 3 shows a functional block diagram of the performance of purchase prediction operations implemented in accordance with an embodiment of the invention. In step 302, a proportion of occurrences matrix is generated, as described in greater detail herein, for a set of purchasers and an associated set of products. As used herein, a purchaser broadly refers to an entity that purchases a product. In certain embodiments, the purchaser may be an individual, a representative of an organization, a system, an automated or semi-automated process, or a combination thereof. As likewise used herein, a purchase broadly refers to the acquisition of a product, regardless of whether or not there is an exchange of value. As an example, a purchaser may acquire a product at no cost.

Likewise, as used herein, a product broadly refers to a deliverable that can be provided to a purchaser, such as a physical item, content, or a service. Examples of physical items that are a product include durable and consumable goods of various sorts. Likewise, examples of content that are a product include physical or digital content, such as images, video programs, and information of various types. Examples of a service that are a product include services provided by an individual, such as repair services, and services provided in a cloud environment. Skilled practitioners of the art will recognize that many examples of such products are possible. Accordingly, the foregoing is not intended to limit the spirit, scope or intent of the invention.

A number of historical purchase periods 'N' and a number of future purchase periods 'P' are then selected in step 304. As used herein, a purchase period broadly refers to a period of time within which a purchase is made by a purchaser. Examples of a purchase period include a day, a week, a month, a quarter, a year, or longer. A target purchaser is selected in step 306, followed by capturing the product term(s), described in greater detail herein, associated with their most recent purchase period in step 308.

Similarity quotient scores are then calculated for neighbor purchasers in step 310, which are then ranked in decreasing order, as described in greater detail herein. A dictionary is then created in step 312 whose key is the reverse index positions associated with various purchase periods and whose values are less than, or equal to, 'P' product purchase patterns, as likewise described in greater detail herein. An element score is then calculated in step 314, likewise as described in greater detail herein, for every product term in the dictionary. The top 'P' highest-ranking product terms are then selected in step 316 and provided as a product purchase pattern prediction.

FIGS. 4a and 4b show a matrix implemented in accordance with an embodiment of the invention to depict the historical purchase of certain products by various purchasers during a particular purchase period. In this embodiment, certain products are represented by a corresponding term, such as 'q', 'w', 'e', 'r', 't', and 'y'. As an example, the term 'q' may represent servers, 'w' may represent desktop computers, and 'e' may represent laptop computers. Likewise, the term 'r' may represent routers, T may represent monitors, 'y' may represent printers, and so forth.

As shown in FIG. 4a, certain combinations 406 of products, each respectively represented by a corresponding term, may be purchased by various purchasers 402 during a particular purchase period 404. As likewise shown in FIG. 4a, a particular purchaser may make no purchase of a product during certain purchase periods 404. Accordingly, as shown in FIG. 4b, the term "GAP" 408 may be used in certain embodiments to signify no purchases made by a particular purchaser 402 during a corresponding purchase period 404.

FIG. 5 shows a proportion of occurrences matrix implemented in accordance with an embodiment of the invention. In certain embodiments, the proportion of occurrences matrix 500 contains the proportion of each product 504 purchased by a particular purchaser 402. Accordingly, the proportional occurrence 506 of each product 504 for each purchaser 402 may be calculated in certain embodiments as follows:

$$\text{Proportion of Occurrences} = \frac{\text{Number of occurrences of a } LOB \text{ in the considered historical time period}}{\text{Sum of all occurrences of all } LOB\text{'s in the considered historical time period}}$$

FIG. 6 shows a purchase history table implemented in accordance with an embodiment of the invention to depict product purchases historically made by a purchaser during various purchase periods. As shown in the purchase history table 600 depicted in FIG. 6, target purchaser 602 '1002' has respectively purchased products 'q' and 'w' in purchase periods 404 '2' and '8', and product 'r' in purchase period 404 '7'. Likewise, the target purchaser 602 '1002' has purchased product 'r' in purchase periods 404 '3', '6', and '10', which is the most recent purchase period 606. As likewise signified by the use of the term "GAP" in the purchase history table 600, the target purchaser 602 '1002' has purchased no products in purchase periods 404 '1', '4', '5', and '9'.

FIG. 7 shows a purchaser similarity quotient matrix implemented in accordance with an embodiment of the invention. In certain embodiments, the proportion of occurrences matrix 500 shown in FIG. 5 is used to compute a similarity quotient score 704 a target purchaser 602 and a corresponding neighbor purchaser 704. As used herein, a neighbor purchaser 704 broadly refers to all purchasers in a set of purchasers, including a particular target purchaser 602. In certain embodiments, the resulting similarity quotient score 704 represents the degree of similarity between the historical purchase behavior of a particular target purchaser 602 and each of its neighbor purchasers 704.

In certain embodiments, the similarity quotient score may be calculated from the proportion of occurrences matrix based upon various distance measure functions familiar to skilled practitioners of the art. In certain embodiments, the distance measure functions may include Euclidean distance, Manhattan distance, Minkowski distance, Cosine Similarity, and others, likewise familiar to those of skill in the art. In certain embodiments, the similarity quotient score 704 is dependent on the domain and application associated with its implementation. Accordingly, in certain embodiments the value of the similarity quotient score 704 may be subjective.

In certain embodiments, the range of a similarity quotient score 704 may be expressed as a numeric value greater than or equal to zero and less than or equal to one [0, 1]. In these embodiments, a higher numeric value represents a closer similarity to a neighbor purchasers historical purchase behavior. In certain embodiments, each target purchaser 602 is a neighbor purchaser 704 to itself. Accordingly, it will have a similarity quotient score of 1.00 as its historical purchase behavior is the same.

In certain embodiments, a similarity quotient threshold $(SQ_t)$ value may be implemented to select neighbor purchasers with the most similar historical purchase behavior. In these embodiments, the method by which the $SQ_t$ value is determined is a matter of design choice. For example, as shown in the purchaser similarity quotient matrix 700, a $SQ_t$ value of 0.8 results in neighbor purchasers 402 '1001', '1002' and '1008' having the highest similarity quotient scores 706 for purchaser 40e '1002'.

FIGS. 8a through 8e show a process flow of operations implemented in accordance with an embodiment of the invention to identify a historical purchase pattern associated with a target purchaser. In this embodiment, as described in greater detail in the text associated with FIG. 7, neighbor purchasers 704 '1002', '1001' and '1008' respectively have the highest similarity quotient scores 806 of '1.000', '0.980' and '0.836' for a target purchaser 802. As shown in FIG. 8a, they are arranged in decreasing order to indicate the degree of similarity of their corresponding neighbor purchaser's 804 historical purchase behavior to the target purchaser 802 '1002'.

In certain embodiments, index 808 and reverse index 810 positions are assigned to purchase periods 404 as shown in FIG. 8b. The neighbor purchaser 804 with the highest similarity purchase score 806 is then selected for processing. As likewise described in greater detail in the text associated with FIG. 7, target purchaser 802 '1002' is a neighbor purchaser 804 '1002' to itself. Accordingly, it has the highest possible similarity quotient score of '1.000' and is selected for processing first.

The product term for the product purchased in the most recent purchase period 404 is then determined. As an example, product term 'r' 812 was purchased in purchase period 404 '10', which has an index 808 position of '10' and a reverse index 810 position of '1'. In certain embodiments, a forecast interval 'P' 814 is selected, corresponding to the number of purchase periods 404 intended to be used to forecast future purchases by the target purchaser 802. In these embodiments, the number of purchase periods 404 selected for the forecast interval 'P' 814 is a matter of design choice.

To continue the example, as shown in FIG. 8*b*, the number ('N') of purchase periods 404 is ten. To continue the example, a forecast interval 'P' 814 may be selected to be three purchase periods 404 in duration into the future. Accordingly, an initial search position for other purchases of the product term 'r' 812 purchased in purchase period 404 '10' may be determined in certain embodiments by subtracting the forecast interval 'P' 814 from the total number 'N' purchase periods 404.

Consequently, the purchase periods 404 are then traversed 816, beginning with an initial purchase period 404 '7', which is determined by subtracting the value 'P' of '3' purchase periods 404 from the total number 'N' of '10' purchase periods 404 to determine whether the same product term has been purchased in the past. As a result, traversal 816 of the purchase periods 404 indicates that product term 'r' 818 was purchased during purchase period 404 '6', which respectively has index 808 and reverse index 810 positions of '6' and '5'. Likewise, product term 'r' 820 was purchased during purchase period 404 '3', which respectively has index 808 and reverse index 810 positions of '3' and '8'.

As shown in FIG. 8*c*, the three purchase periods 404 '7', '8' and '9' following purchase period 404 '6', during which product term 'r' 818 was purchased, correspond to the duration of forecast interval 'P' 814. Accordingly, the product terms they contain, 'e', 'qw' and 'GAP', are pruned and stored in the order they occurred as forecasted purchases 822. Once the product terms 'e', 'qw' and 'GAP' corresponding to purchase periods 404 '7', '8' and '9' are pruned and stored, product term 'r' 812 corresponding to purchase period 404 '10' is likewise pruned.

The process is then repeated for the second occurrence of the purchase of product term 'r' 820, which took place in purchase period 404 '3'. As shown in FIG. 8*d*, purchase periods 404 '4' and '5' both contain the product term 'GAP' 824. In certain embodiments, sequential purchase periods 404 that contain the product term 'GAP' may be processed to generate a product term 'GAP$_n$', where 'n' signifies the number of consecutive purchase periods 404 containing the product term 'GAP'.

Accordingly, the product term 'GAPS' 824 corresponding to purchase periods 404 '4' and '5' are combined to generate product term 'GAP$_2$' 826, which signifies two consecutive product terms 404 containing the product term 'GAP'. Any purchase periods 404 subsequent to purchase period 404 '6' are the pruned 828, and the sequence of product terms 'GAP$_2$' and 'r' are stored as a purchase pattern for the target purchaser 802 '1002'. The process is then repeated for the remaining neighbor purchasers 804 '1001' and '1008'.

In certain embodiments, a particular product term 'GAP' may receive a higher weighting than a product term corresponding to the purchase of a given product, which in turn may result in the product term 'GAP' receiving a higher prediction value than expected. According, consecutive product term 'GAPS' may not be combined in certain embodiments. Instead, they are treated as individual product term 'GAPs', in the form 'GAP$_1$', 'GAP' . . . 'GAP$_n$' to improve 'GAP' prediction accuracy. In certain of these embodiments, the individual product term 'GAPS' may receive a corresponding weighting factor dependent upon their respective placement within in a series of consecutive product term 'GAPS'.

In certain embodiments, the search for a particular combination of product terms in the most recent purchase period 404 may result in no exact matches being found. As an example, a purchaser may have purchased product terms 'q', 'r' and 'w' in the most recent purchase period. However, that same combination of product terms may not have been purchased before. Instead, product terms 'q' and 'w' may have been purchased together in two different purchase periods 404 while product term 'r' may have been purchased in yet two other purchase periods 404. Accordingly, fuzzy search approaches familiar to skilled practitioners of the art may be implemented in certain embodiments to find the closest combination of purchase terms corresponding to past purchases by a particular target 802 or neighbor 804 purchaser. In certain embodiments, the criteria used for such fuzzy searches may include beginning with an exact match and proceeding until a subset of at least one matching product term associated with the most recent purchase period 404 is found.

FIGS. 9*a* through 9*d* show a process flow of operations implemented in accordance with an embodiment of the invention to forecast a target purchaser's product purchases in future purchase periods. In certain embodiments, a dictionary is generated whose index is the reverse index position 1102 of a purchase period, described in greater detail herein, and whose values are purchase patterns 904 of historical product term purchases, likewise described in greater detail herein. In certain embodiments, purchase periods associated with neighbor purchasers 906 are traversed in decreasing order of their similarity quotient score 908, capturing the reverse index positions 1102 of the purchase period containing the same product term purchased by a target purchaser in the most recent purchase period. Accordingly, as shown in FIG. 9*b*, a target purchaser '1002' will have neighbor purchasers 906 '1002', '1001' and '1008' according to their respective similarity quotient scores 908 of '1.000', '0.980' and '0.836', which are greater than a previously-determined similarity quotient threshold (SQ$_t$) value of '0.8'.

In certain embodiments, a concerted recommendation score (CRS) and sequential recommendation score (SRS) may be implemented to generate element scores 912 for each product term 910 in a purchase pattern 904 associated with a neighbor purchaser 906. In certain embodiments, a concerted recommendation score (CRS) may be calculated as follows:

$$\text{Concerted Recommendation Score } (CRS) = \\ 1 + \frac{\text{Similarity Quotient}}{\text{Number of Neighbor Purchasers}}$$

Accordingly, the CRS for neighbor purchasers 906 shown in FIG. 9*b* can be calculated as follows:

$$CRS_{1002} = 1 + \frac{1}{3} = 1.333$$

$$CRS_{1001} = 1 + \frac{0.98}{3} = 1.327$$

-continued $$CRS_{1008} = 1 + \frac{0.836}{3} = 1.279$$

In certain embodiments, a sequential recommendation score (SRS) may be calculated as follows:

Sequential Recommendation Score (SRS) =
$$\frac{10^{-n}}{1 + \log(10 + \text{Reverse Index}) \times \text{position}}$$

where "position"→ranges from 1 to 3 (going from left to right) and is dependent upon where each product term 910 lies in a purchase pattern 904, and 'n'→is the number of neighbor purchasers 906.

The product terms 910 of each purchase pattern 904 are then added to a dictionary along with an associated element score (ES), with the following condition(s), where:

Element Score (ES) =
$$\begin{cases} CRS + SRS, & \text{if element not already present in dictionary} \\ (CRS + SRS) \times ES_{old}, & \text{otherwise} \end{cases}$$

As an example, beginning with the first purchase pattern 904 of product terms 910 'e', 'qw', 'GAP' associated with the reverse index position 902 '5' of neighbor purchaser 906 '1002':

$$ES_e =$$
$$CRS_{1002} + SRS_e = 1.333 + \frac{10^{-1}}{1 + \log(10 + 5) \times 1} = 1.333 + \frac{1}{21.76} = 1.379$$

$$ES_{qw} = CRS_{1002} + SRS_{qw} =$$
$$1.333 + \frac{10^{-1}}{1 + \log(10 + 5) \times 2} = 1.333 + \frac{1}{33.52} = 1.363$$

$$ES_{GAP} = CRS_{1002} + SRS_{GAP} =$$
$$1.333 + \frac{10^{-1}}{1 + \log(10 + 5) \times 3} = 1.333 + \frac{1}{45.28} = 1.355$$

Likewise, continuing with the second purchase pattern 904 of product terms 910 'GAP$_2$', 'r' associated with the reverse index position 902 '8' of neighbor purchaser 906 '1002':

$$ES_{GAP2} = CRS_{1002} + SRS_{GAP2} =$$
$$1.333 + \frac{10^{-1}}{1 + \log(10 + 8) \times 1} = 1.333 + \frac{1}{22.55} = 1.378$$

$$ES_r = CRS_{1002} + SRS_r =$$
$$1.333 + \frac{10^{-1}}{1 + \log(10 + 8) \times 2} = 1.333 + \frac{1}{35.11} = 1.362$$

Continuing with the first purchase pattern 904 of product terms 910 'GAP', 'e' 'GAP$_2$' associated with the reverse index position 902 '5' of neighbor purchaser 906 '1001':

$$ES_{GAP} =$$
$$CRS_{1001} + SRS_{GAP} = 1.327 + \frac{10^{-1}}{1 + \log(10 + 5) \times 1} = 1.327 + \frac{1}{21.76} = 1.373$$

However, as $ES_{GAP}$ already exists in the dictionary, the old element score 912 is multiplied by the new element score 912 calculated above to result in a revised element score 912 for $ES_{GAP}$, as follows:

$$ES_{GAP} = ES_{GAP\ old} \times ES_{GAP} = 1.355 \times 1.373 = 1.860$$

Likewise, the element score 912 of product term 910 'e' in the purchase pattern 904 may be calculated as follows:

$$ES_e =$$
$$CRS_{1000001} + SRS_e = 1.327 + \frac{10^{-1}}{1 + \log(10 + 5) \times 2} = 1.327 + \frac{1}{33.52} = 1.356$$

However, as $ES_e$ already exists in the dictionary, the old element score 912 is multiplied by the new element score 912 calculated above to result in a revised element score 912 for $ES_e$:

$$ES_e = ES_{e\ old} \times ES_e = 1.379 \times 1.356 = 1.871$$

The element score 912 for product term 910 'GAP$_2$' in the purchase pattern 904 may likewise be calculated as follows:

$$ES_{GAP2} = CRS_{1001} + SRS_{GAP2} =$$
$$1.327 + \frac{10^{-1}}{1 + \log(10 + 5) \times 3} = 1.327 + \frac{1}{45.28} = 1.349$$

However, as $ES_{GAP2}$ already exists in the dictionary, the old element score 912 is multiplied by the new element score 912 calculated above to result in a revised element score 912 for $ES_{GAP2}$ as follows:

$$ES_{GAP2} = ES_{old} \times ES_{GAP2} = 1.378 \times 1.349 = 1.859$$

The process is then repeated for all other purchase patterns 904 associated with other neighbor purchasers 906 until a final dictionary of element scores 912 is completed for each product term 910, as shown in FIG. 9c. The top three product terms 910 are then selected, according to their respective element scores 912, as a predicted purchase pattern 916 of 'GAP', 'r', 'GAP$_2$', respectively corresponding to future purchase periods 914 '1', '2', '3', for target purchaser '1002'. However, as the product term 910 'GAP$_2$' signifies two consecutive 'GAP' purchase periods, the final predicted purchase pattern 916 corresponding to future purchase periods 914 '1', '2', '3' for target purchaser '1002' would be 'GAP', 'r', 'GAP', as shown in FIG. 9d.

FIGS. 10a through 10d are a flowchart of the performance of product purchase prediction operations implemented in accordance with an embodiment of the invention. In this embodiment, product purchase prediction operations begin in step 1002, followed by the selection of a set of purchasers and a set of products for purchase predictions in step 1004. In certain embodiments, the method by which the set of purchasers and the set of products are selected is a matter of design choice. A proportion of occurrences matrix, described in greater detail herein, is generated in step 1006, followed by the selection of 'N' number of historical purchase periods and a forecast interval of 'P' purchase periods in step 1008, as likewise described in greater detail herein.

A target purchaser is then selected in step 1010, followed by a determination being made in step 1012 whether the target purchaser's most recent purchase period being a "GAP" purchase period, during which no associated product purchases were made. If so, then the product terms that were purchased are designated as the result of the most recent purchase period in step 1014. If not, then a determination is made in step 1016 whether the "GAP" purchase period is preceded by one or more other "GAP" purchase periods. If not, then "GAP" is designated as the result of the most recent purchase period in step 1018. Otherwise, the consecutive "GAP" purchase periods are compressed, as described in greater detail herein, in step 1020 to generate a "GAP$_n$," purchase period, where 'n' signifies the number of "GAP" purchase periods that were compressed.

Thereafter, or once the processes that may have been performed in steps 1014 or 1018 have been completed, the previously-generated proportion of occurrences matrix is used in step 1022 to generate a similarity quotient score for all accounts, as described in greater detail herein. A similarity quotient threshold score (SQ$_t$), likewise described in greater detail herein, is selected in step 1024, followed by ranking neighbor purchasers in decreasing order of their similarity quotient scores in step 1026. The neighbor purchaser with the highest similarity quotient score above the previously-selected SQ$_t$ is then selected in step 1028.

The selected neighbor purchaser's purchase history is then searched in step 1030, as described in greater detail herein, for the same result as the target purchaser's most recent purchase period. A determination is then made in step 1032 whether the same result is found. If so, then a determination is made in step 1034 whether the same result is equivalent to "GAP$_n$". If so, then the reverse index position, described in greater detail herein, is captured in step 1036 for every "GAP" purchase period associated with the "GAP$_n$," result. Thereafter any consecutive "GAP" purchase periods subsequent to the reverse index position are compressed and designated as "GAP$_n$" for the neighbor purchaser's next purchase period.

Thereafter, or after the reverse index position of the found result is captured in step 1040, the results of the next less than, or equal to, 'P' purchase periods are captured and stored in step 1042, as described in greater detail herein, as a product purchase pattern. The purchase period sequence subsequent to the reverse index position is then pruned in step 1044, followed by a determination being made in step 1046 whether same result is found again in the neighbor purchaser's purchase history. If so, then the process is continued, proceeding with step 1040. If not, then a determination is made in step 1048 whether the purchase history associated with the last neighbor account has been searched. If not, then the neighbor purchaser with the next highest similarity quotient score is selected in step 1050 and the process is continued, proceeding with step 1030.

However, if it was determined in step 1048 that the purchase history associated with the last neighbor account has been searched, then a dictionary is created in step 1052, as described in greater detail herein, where the captured reverse index positions of each purchase period are used as its key and its values are less than, or equal to 'P' stored purchase patterns respectively corresponding to each reverse index position. A concerted recommendation score for each neighbor purchaser is calculated in step 1054, as likewise described in greater detail herein. Thereafter, a sequential recommendation score is calculated in step 1056, likewise as described in greater detail herein, for the result associated with each purchase period in each purchase pattern.

The product terms associated with each stored purchase pattern is then added to an element score dictionary in step 1058, followed by adding the product terms associated with all other purchase patterns of other neighbor purchasers to the element score dictionary in step 1060. An element score is then calculated in step 1062, as described in greater detail herein, for each product term, followed by the selection of the top 'P' product terms in step 1064 according to their respective element scores. The selected product terms are then provided in step 1066 as a purchase pattern prediction for the target account, followed by a determination being made in step 1068 whether to end product purchase prediction operations. If not, then the process is continued, proceeding with step 1010. Otherwise, product purchase prediction operations are ended in step 1070.

Figure 11:
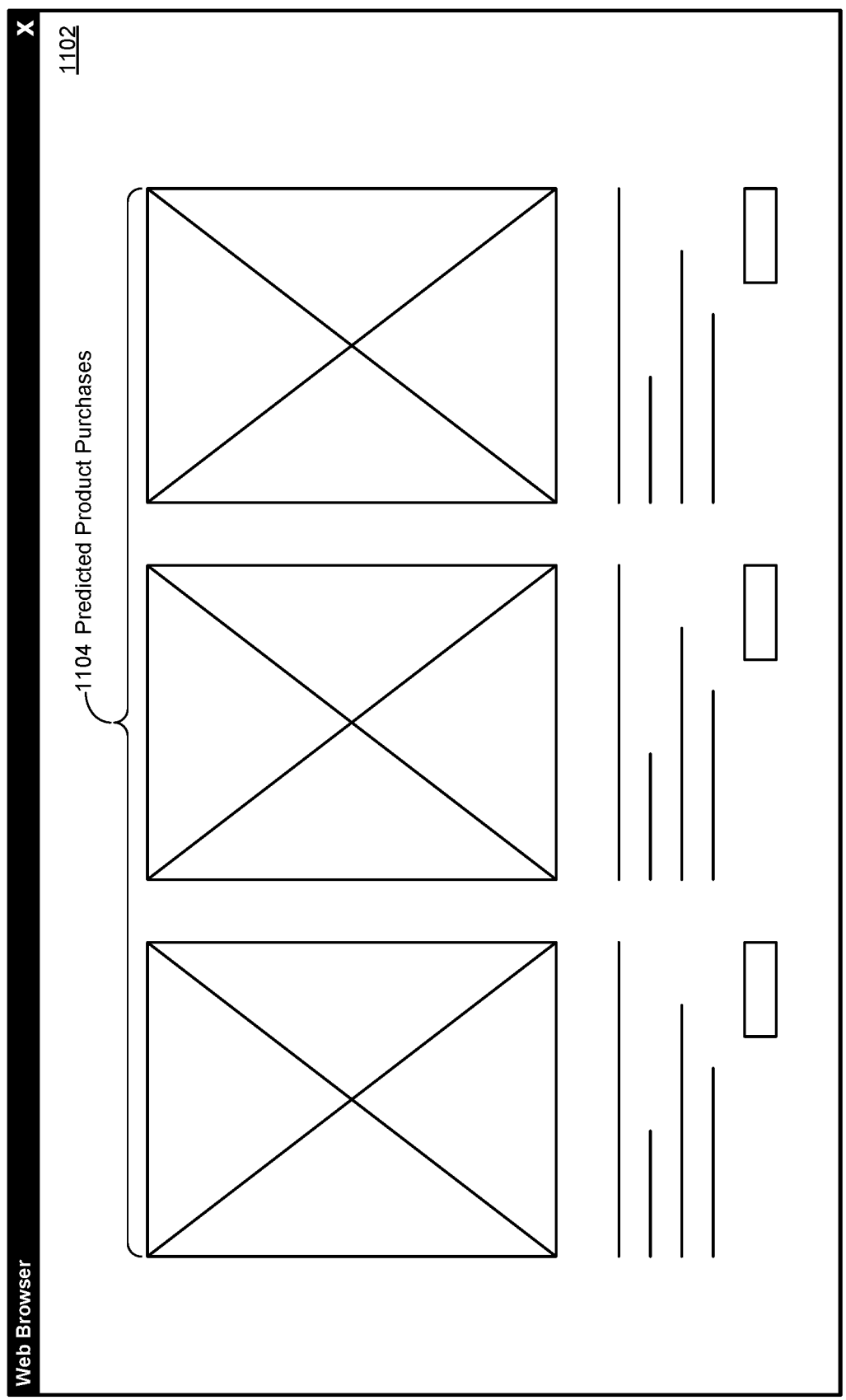
FIG. 11 shows an example screen presentation of a product purchase prediction system user interface.

Referring to FIG. 11, an example screen presentation of a product purchase prediction system user interface is shown. In certain embodiments, a set of predicted product purchases 1104 may be presented within a window 1102 of the product purchase prediction system user interface (UI) 1102.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++, 'R', Python, or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a purchase prediction operation, comprising:
   selecting a target purchaser, the purchase prediction operation providing a purchase prediction for the target purchaser;
   capturing a product term associated with a most recent purchase period of the target purchaser;
   performing a sequential recommendation operation, the sequential recommendation operation providing a sequential recommendation score, the sequential recommendation score being based upon a number of historical purchase periods, a number of future purchase periods, and a similarity quotient score, the similarity quotient score representing a degree of similarity between historical purchase behavior of the target purchaser and historical purchase behavior of at least one neighbor purchaser, the-neighbor purchaser comprising a purchaser in a set of purchasers, the set of purchasers including the target purchaser and another neighbor purchaser;
   using the similarity quotient score to select neighbor purchasers with similar historical purchase behavior; and,
   generating a purchase pattern prediction for the target purchaser based upon the sequential recommendation score and the neighbor purchasers with similar historical purchase behavior.

2. The method of claim 1, wherein:
the sequential recommendation operation comprises a concerted learning component (CLC) and a multi-instance sequential component (MISC).

3. The method of claim 1, wherein:
the sequential recommendation operation uses historical purchase patterns associated with similar customers to provide predictions of future purchases for the purchaser.

4. The method of claim 1, wherein:
the sequential recommendation operation is implemented to search for most recent list of products (MRLP) purchased by a target customer during a most recent purchase period.

5. The method of claim 4, wherein:
searching for the MRLP is performed for similar customers, the result of searching for the MRLP for similar customers being used to generate a prediction tree, the prediction tree being based on a multi-instance occurrence of MRLP.

6. The method of claim 5, wherein:
the prediction tree is implemented to capture multiple sets of 'n' purchase sequences (n-PS) after the MRLP; and,
MISC scores are computed for each purchase sequence n-PS.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
   selecting a target purchaser, the purchase prediction operation providing a purchase prediction for the target purchaser;
   capturing a product term associated with a most recent purchase period of the target purchaser;
   performing a sequential recommendation operation, the sequential recommendation operation providing a sequential recommendation score, the sequential recommendation score being based upon a number of historical purchase periods, a number of future purchase periods, and a similarity quotient score, the similarity quotient score representing a degree of similarity between historical purchase behavior of the target purchaser and historical purchase behavior of at least one neighbor purchaser, the-neighbor purchaser comprising a purchaser in a set of purchasers, the set of purchasers including the target purchaser and another neighbor purchaser;
   using the similarity quotient score to select neighbor purchasers with similar historical purchase behavior; and, generating a purchase pattern prediction for the target purchaser based upon the sequential recommendation score and the neighbor purchasers with similar historical purchase behavior.

8. The system of claim 7, wherein:

the sequential recommendation operation comprises a concerted learning component (CLC) and a multi-instance sequential component (MISC).

9. The system of claim 7, wherein:

the sequential recommendation operation uses historical purchase patterns associated with similar customers to provide predictions of future purchases for the purchaser.

10. The system of claim 9, wherein:

the sequential recommendation operation is implemented to search for most recent list of products (MRLP) purchased by a target customer during a most recent purchase period.

11. The system of claim 10, wherein the instructions executable by the processor are further configured for:

searching for the MRLP is performed for similar customers, the result of searching for the MRLP for similar customers being used to generate a prediction tree, the prediction tree being based on a multi-instance occurrence of MRLP.

12. The system of claim 11, wherein:

the prediction tree is implemented to capture multiple sets of 'n' purchase sequences (n-PS) after the MRLP; and, MISC scores are computed for each purchase sequence n-PS.

13. A non-transitory, computer-readable storage medium embodying computer program code, the computer program code comprising computer executable instructions configured for:

selecting a target purchaser, the purchase prediction operation providing a purchase prediction for the target purchaser;

capturing a product term associated with a most recent purchase period of the target purchaser;

performing a sequential recommendation operation, the sequential recommendation operation providing a sequential recommendation score, the sequential recommendation score being based upon a number of historical purchase periods, a number of future purchase periods, and a similarity quotient score, the similarity quotient score representing a degree of similarity between historical purchase behavior of the target purchaser and historical purchase behavior of at least one neighbor purchaser, the-neighbor purchaser comprising a purchaser in a set of purchasers, the set of purchasers including the target purchaser and another neighbor purchaser;

using the similarity quotient score to select neighbor purchasers with similar historical purchase behavior; and, generating a purchase pattern prediction for the target purchaser based upon the sequential recommendation score and the neighbor purchasers with similar historical purchase behavior.

14. The non-transitory, computer-readable storage medium of claim 13, wherein:

the sequential recommendation operation comprises a concerted learning component (CLC) and a multi-instance sequential component (MISC).

15. The non-transitory, computer-readable storage medium of claim 13, wherein:

the sequential recommendation operation uses historical purchase patterns associated with similar customers to provide predictions of future purchases for the purchaser.

16. The non-transitory, computer-readable storage medium of claim 15, wherein:

the sequential recommendation operation is implemented to search for most recent list of products (MRLP) purchased by a target customer during a most recent purchase period.

17. The non-transitory, computer-readable storage medium of claim 16, wherein the computer executable instructions are further configured for:

searching for the MRLP is performed for similar customers, the result of searching for the MRLP for similar customers being used to generate a prediction tree, the prediction tree being based on a multi-instance occurrence of MRLP.

18. The non-transitory, computer-readable storage medium of claim 17, wherein:

the prediction tree is implemented to capture multiple sets of 'n' purchase sequences (n-PS) after the MRLP; and, MISC scores are computed for each purchase sequence n-PS.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

* * * * *